United States Patent
Cooper et al.

(10) Patent No.: US 9,375,896 B2
(45) Date of Patent: Jun. 28, 2016

(54) POLYMERIC LABEL MATERIAL

(75) Inventors: Jonathan Cooper, Essex (GB); Mark Grimbley, Essex (GB); Bharath Chandra, Charlotte, NC (US); Vijay Yadav, Charlotte, NC (US)

(73) Assignee: ARJOBEX LIMITED, Essex (GB)

( * ) Notice: Subject to any disclaimer, the term of this patent is extended or adjusted under 35 U.S.C. 154(b) by 402 days.

(21) Appl. No.: 13/813,303

(22) PCT Filed: Jul. 27, 2011

(86) PCT No.: PCT/GB2011/001127
§ 371 (c)(1),
(2), (4) Date: Jul. 18, 2013

(87) PCT Pub. No.: WO2012/035284
PCT Pub. Date: Mar. 22, 2012

(65) Prior Publication Data
US 2013/0292031 A1    Nov. 7, 2013

(30) Foreign Application Priority Data
Sep. 14, 2010    (GB) .................................. 1015297.3

(51) Int. Cl.
| B32B 7/12 | (2006.01) |
| B32B 27/32 | (2006.01) |
| G09F 3/10 | (2006.01) |
| B32B 7/02 | (2006.01) |
| B32B 27/08 | (2006.01) |
| B32B 27/20 | (2006.01) |

(52) U.S. Cl.
CPC ... *B32B 7/12* (2013.01); *B32B 7/02* (2013.01); *B32B 27/08* (2013.01); *B32B 27/205* (2013.01); *B32B 27/32* (2013.01); *G09F 3/10* (2013.01); *B32B 2255/10* (2013.01); *B32B 2307/518* (2013.01); *B32B 2307/72* (2013.01); *B32B 2307/75* (2013.01); *B32B 2519/00* (2013.01); *Y10T 156/10* (2015.01); *Y10T 428/249983* (2015.04)

(58) Field of Classification Search
CPC ............ Y10T 428/249983; G09F 3/10; B32B 27/205; B32B 7/12; B32B 2519/00; B32B 2307/518
See application file for complete search history.

(56) References Cited

U.S. PATENT DOCUMENTS

| 6,517,664 B1 | 2/2003 | Dronzek, Jr. |
| 2003/0207138 A1 | 11/2003 | Kong et al. |
| 2006/0046005 A1 | 3/2006 | McGee |
| 2010/0126991 A1* | 5/2010 | Kimura et al. ................ 220/200 |

FOREIGN PATENT DOCUMENTS

| WO | WO 91/15365 | 10/1991 |
| WO | WO 2004/007196 A1 | 1/2004 |

OTHER PUBLICATIONS

International Search Report issued in corresponding International Application No. PCT/GB2011/001127 mailed Oct. 7, 2011.
Search Report issued in corresponding Great Britain Application No. 1015297.3 on Dec. 8, 2010.

* cited by examiner

*Primary Examiner* — Hai Vo
(74) *Attorney, Agent, or Firm* — Knobbe Martens Olson & Bear LLP

(57) ABSTRACT

A label material for use with water-based adhesives. The label material includes a synthetic paper having an upper surface and a lower surface. The synthetic paper includes a biaxially-oriented polymeric sheet having a voided layer. A printable coating is optionally provided on an upper surface of the polymeric sheet and an adhesive-receiving coating is provided on a lower surface of the polymeric sheet. The polymeric sheet has a density of not more than 0.55 g·cm$^{-3}$. The adhesive-receiving coating includes a polymeric binder and an absorbent pigment and has a surface energy of at least 40 dyne·cm$^{-1}$.

17 Claims, 2 Drawing Sheets

POLYMERIC LABEL MATERIAL

This application is the U.S. National Phase under 35 U.S.C. §371 of International Application PCT/GB2011/001127, filed Jul. 27, 2011, designating the U.S., and published in English as WO 2012/035284 on Mar. 22, 2012, which claims priority to Great Britain Patent Application No. 1015297.3, filed Sep. 14, 2010, the entire content of which is incorporated herein by reference.

The present invention relates to a polymeric label material for use with water-based adhesives, and to a method of labelling. In particular, the invention relates to a polymeric label material for labelling non-absorbent products, for example glass or plastic containers, using water-based adhesives. The invention also relates to a labelled product.

Products sold in bottles, cans and other containers have traditionally been labelled using paper labels that are secured to the container with a water-based adhesive. This method of labelling is quick and relatively inexpensive, but it has the disadvantage that the paper labels can be easily damaged (for example scuffed or torn) and they have a tendency to peel or fall off if they become wet or are stored in damp conditions, for example during refrigeration.

These disadvantages can sometimes be overcome by using labels made of synthetic paper (commonly referred to as "plastic labels"). Synthetic paper is a polymeric material, typically based on polyethylene or polypropylene, which is stretched and orientated to form a film with a stiffness and feel similar to that of conventional cellulose paper. Plastic labels are generally stronger and more durable than paper labels and are not easily scuffed or torn, especially when wet. They are also waterproof and do not peel or fall off if the product becomes damp or wet.

Conventional plastic labels are self-adhesive: that is, they are coated with a layer of adhesive that is covered prior to being applied to the product with a release liner (for example a sheet of paper coated with a silicone release material). Although self-adhesive plastic labels overcome many of the problems of traditional paper labels, they are expensive—a large part of the additional cost resulting from the need for a release liner.

Also, available processes for applying self-adhesive plastic labels are generally much slower than processes for applying paper labels using a water-based adhesive. This leads to additional production costs.

WO2004/007196A describes a tamper-evident labelling material for use with pressure-sensitive adhesives. The labelling material is made from a polymeric sheet of stretched, voided and coated polyethylene. The coated product has a sheet density of $0.55$ $g \cdot cm^{-3}$. The material has a low internal strength so that it delaminates if an attempt is made to remove the label from the labelled product. The film is coated on the upper surface only so that it can be printed. The lower surface is uncoated and the material is not suitable for use with water-based adhesives.

Various attempts have been made to make plastic labels that can be attached to a product using water-based adhesives. For example, a polypropylene film material of this type is sold under the trade mark LABEL-LYTE 95LP by Exxon Mobil Corporation. However, it has been found that for plastic film products of this type the drying time of the adhesive is generally very long, for example lasting for several hours or even several days as compared to a few minutes for paper labels. This can cause problems with handling the labelled goods and may result in the labels peeling or falling off.

U.S. Pat. No. 6,517,664 (Dronzek) describes a method of labelling a glass, plastic or metal container using a polymeric label having a density of less than $0.9$ $g \cdot cm^{-3}$. The preferred polymeric label is made of polypropylene and has a density in the range $0.55$ to $0.75$ $g \cdot cm^{-3}$. The lower surface is coated with a layer of a hydrophilic material, preferably an acrylic polymer. Claimed drying times with water-based adhesives are from three days to two weeks. This drying performance is vastly inferior to conventional paper labels with typical drying times of several minutes.

It is an object of the present invention to provide a polymeric label material for use with water-based adhesives that mitigates at least some of the aforesaid disadvantages. It is also an object of the invention to provide a method of labelling and a labelled product that mitigates at least some of those disadvantages.

According to the present invention there is provided a label material for use with water-based adhesives, said label material comprising a synthetic paper having an upper surface and a lower surface, the synthetic paper including a biaxially-oriented polymeric sheet having a voided layer, and either no lower skin layer or a lower skin layer with a thickness of no more than 2 μm, and an adhesive-receiving coating on a lower surface of the polymeric sheet, wherein the polymeric sheet has a density of less than $0.55$ $g \cdot cm^{-3}$, and preferably less than $0.50$ $g \cdot cm^{-3}$, and the adhesive-receiving coating includes a polymeric binder and an absorbent pigment and has a surface energy of at least 40 $dyne \cdot cm^{-1}$.

Advantageously, the adhesive-receiving coating has a surface energy of at least 45 $dyne \cdot cm^{-1}$, preferably about 46 $dyne \cdot cm^{-1}$.

We have found that labels made of the label material and applied to products using water-based adhesives dry very rapidly, thus making the use of plastic labels practical and economical. The labels are considerably less expensive than previous self-adhesive plastic labels and they are quicker and easier to apply. The labels are also waterproof and resistant to moisture-related curl and damage, and thus overcome many of the problems associated with traditional paper labels.

Advantageously, the synthetic paper has a grammage of not more than 80 $g \cdot m^{-2}$, and preferably not more than 70 $g \cdot m^{-2}$. This is a measure of the total weight of the paper, including the polymeric sheet and, if provided, any surface coatings.

Advantageously, the synthetic paper has a thickness of at least 100 μm, typically being about 120 μm.

The polymeric sheet (not including any surface coatings) has a density of not more than $0.55$ $g \cdot cm^{-3}$, and preferably not more than $0.5$ $g \cdot cm^{-3}$. This implies that the voided core layer must be very highly voided.

Advantageously, the voided layer has a thickness of at least 90 μm, preferably about 100 μm.

Advantageously, the biaxially-oriented polymeric sheet includes a substantially unvoided upper skin layer. The optional upper skin layer, if provided, preferably has a thickness in the range 5-15 μm, more preferably about 10 μm.

Advantageously, the voided layer has a density of less than $0.5$ $g \cdot cm^{-3}$, preferably less than $0.45$ $g \cdot cm^{-3}$ Advantageously, the voided layer has a void volume of at least 40%, preferably at least 50%.

Advantageously, the voided layer has an open cell structure.

Advantageously, the voided layer and the skin layer or layers are co-extruded.

Advantageously, the lower skin layer, if provided, is substantially unvoided.

Advantageously, the lower skin layer has a thickness in the range 0.5-2 μm, preferably about 1 μm.

Advantageously, the lower skin layer is porous. The porosity may be provided for example by the presence of a granular filler material, for example calcium carbonate, in either the voided layer or the lower skin layer, whereby the granules perforate the lower skin layer.

Advantageously, the polymeric sheet is made of a polymeric material based on polyethylene. Preferably, the polymeric sheet is made of biaxially-oriented and voided high density polyethylene (HDPE). The term "high density polyethylene" as used herein refers to polymers and copolymers of ethylene with minor amounts of other α-olefin monomers. The term is also used to refer to mixtures of high density polyethylenes. Alternatively, the polymeric sheet may be based on other polymeric materials, for example polypropylene.

Advantageously, the polymeric material of the voided layer includes a voiding agent, for example maleic rosin ester such as that sold under the trade mark Dertoline MP 170.

Advantageously, the label material includes a printable coating on an upper surface of the polymeric sheet. The optional printable coating preferably includes a polymeric binder and an absorbent pigment.

According to another aspect of the invention there is provided a labelled product including a product body and a label attached to the product body with a water-based adhesive, wherein the label is made of a label material according to any one of the preceding statements of invention.

According to another aspect of the invention there is provided a method of labelling a product comprising attaching a label to a product body with a water-based adhesive, wherein the label is made of a label material according to any one of the preceding statements of invention.

Certain embodiments of the invention will now be described, by way of example, with reference to the accompanying figures, in which.

Figure 1:
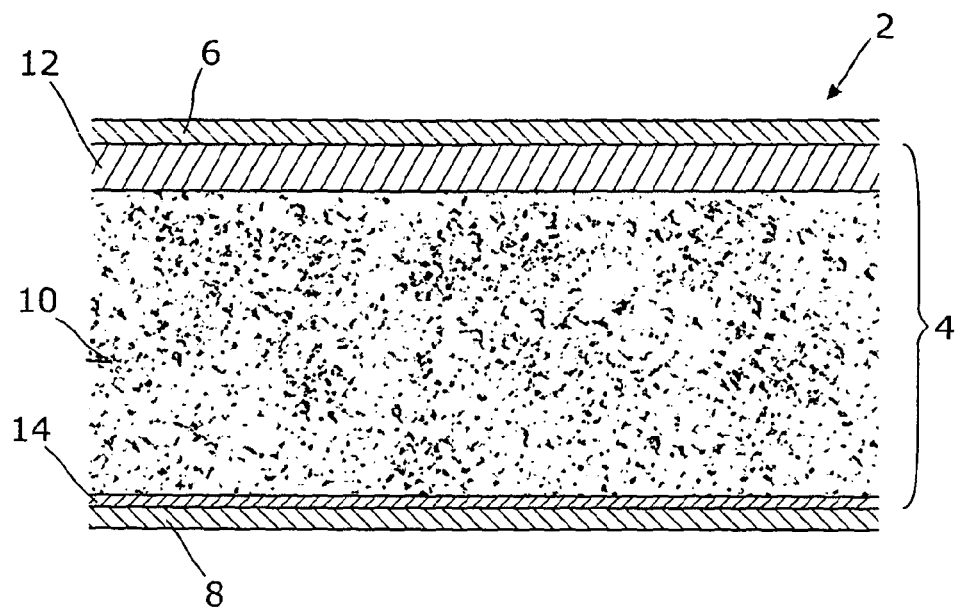
FIG. 1 is a cross-sectional view of a polymeric label material.

The label material 2 shown in FIG. 1 comprises a polymeric film 4 which is coated on its upper surface with a top coating layer 6 and on its lower surface with a bottom coating layer 8. In this example, the polymeric film 4 consists of three distinct layers comprising a core layer 10, an upper skin 12 and a lower skin 14. However, the upper and lower skin layers 12 and 14 are optional and may be omitted.

The polymeric film 4 is of a type known commonly as "synthetic paper", which may be formed by co-extruding two or more polymeric materials through a slot to form a thin web, and then stretching the web biaxially (that is, in its longitudinal and transverse directions) to form a stretched film, which is then allowed to cool. Stretching the film has the effect of orientating the polymer molecules and increases the stiffness of the film so that it resembles conventional cellulose-based paper. Processes for manufacturing stretch orientated polymeric films are well known and are described for example in GB1470372, GB1492771 and GB149012, and will not therefore be described in detail here.

The polymeric material used to form the core layer 10 includes one or more substances known as voiding agents that promote the formation of microscopic voids within the core layer during the stretching process. The voided core layer 10 therefore has a cellular structure. Depending on the degree of stretching, the composition of the polymeric materials and other processing factors, the voided core layer 10 may have either a closed cell structure in which the cells are separated from one another, or an open cell structure in which many of the cells are interlinked.

As a result of the voiding, the density of the core layer is considerably reduced as compared to the density of the polymeric material prior to stretching. For example, in the case of a film made from polyethylene-based materials, the density of the core layer may typically be between 50% and 70% of the density of the unstretched material. In the present invention, an even higher degree of voiding is used so that the density of the core layer is preferably less than 50% and typically approximately 45% of the density of the unstretched material.

The optional upper skin layer 12 and the optional lower skin layer 14 are formed from polymeric materials that do not include voiding agents. Therefore, very few or no voids are formed in the skin layers during the stretching process and the upper and lower skin layers 12,14 are substantially solid. Usually, the upper and lower skin layers are made from the same polymeric material. The upper and lower skin layers 12,14 encapsulate the voided core layer 10 and provide smooth upper and lower surfaces to the sheet. They also improve the feel and handling of the sheet.

The lower surface and preferably also the upper surface of the polymeric film 4 are coated with an absorbent coating material, forming the top coating layer 6 and the bottom coating layer 8. The optional top coating layer 6 is formed from a material that is able to support printing inks, allowing the label to be printed. The lower coating layer 8 is formed from a coating material that has an affinity for a water-based adhesive, so that a label formed from the labelling material 2 can be applied to the surface of a container or other article using a water-based adhesive.

Optionally, the same coating material may be used to form the top coating layer 6 and the bottom coating layer 8. The top and bottom coating layers 6,8 may be applied to the polymer film 4 by any suitable coating process, for example by air-knife coating or gravure coating.

When manufacturing a label material for use with a water-based adhesive, we have found it is important to ensure that the voided core layer 10 has a very low density. This implies that the degree of voiding in the core layer 10 should be very high. Preferably, the voided layer should have an open cell structure.

We have found that the polymeric film 4 should ideally be stretched sufficiently to reduce its overall density to about 50% of the density of the unstretched polymer material, or less. As the upper and lower skin layers are not voided, their density does not change during stretching. This implies that the density of the core layer is preferably reduced to less than 50% of the unstretched core layer material and that the voided core layer 10 has a void volume of at least 50%.

Typically, for polyethylene-based materials the unstretched web material has a density of about 1 g·cm$^{-3}$ and the stretched polymer film 4 has an overall density of about 0.5 g·cm$^{-3}$. This implies that the voided core layer 10 preferably has a density of less than 0.5 g·cm$^{-3}$, typically about 0.45 g·cm$^{-3}$ or less.

We have also found it is important that the lower skin layer 14 should be as thin as possible, or it may be omitted altogether. However, a very thin skin layer may be needed to improve handling of the film. In that case, the lower skin layer should have a thickness in the stretched film of about 0.5-2 microns, preferably about 1 micron.

The upper skin layer 12 is provided for ease of manufacture and to provide a smooth surface for carrying the printable coating. However, it is not essential and may be omitted.

Figure 2:
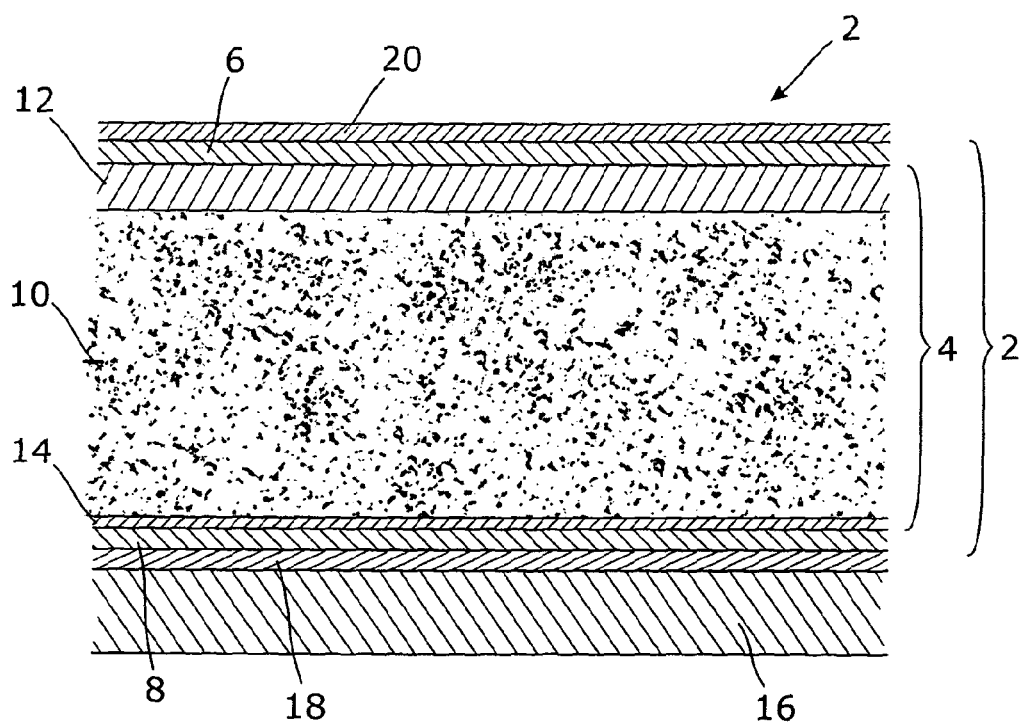
FIG. 2 is a cross-sectional view of a labelled product.

FIG. 2 is a cross-sectional view of a labelled product 16, for example a container such as a glass or plastic bottle, having an attached label 2. The label 2 includes a polymeric film 4 comprising a core layer 10, an upper skin 12 and a lower skin 14. The film 4 is coated on its upper surface with a top coating layer 6 and on its lower surface with a bottom coating layer 8.

The label 2 is attached to a wall of the container 16 by means of a layer of water-based adhesive 18, which is provided between the wall of the container 16 and the lower surface of the label 2. An image is printed on the upper surface of the label 2, forming a layer of ink 20. The top coating layer 6 is designed to receive and support the printed image and may include clays, binders and fillers. The bottom coating layer 18 is designed to absorb and bind the label to the water-based adhesive. Typically, the bottom coating layer includes organic binders and inorganic mineral fillers.

The synthetic paper forming the label material may for example be of a type as described in EP1377446, the content of which is incorporated by reference herein. Preferably, the synthetic paper includes a voided, biaxially oriented core layer with optional co-extruded outer skin layers on one or both sides of the core layer. Typically, the core layer comprises a mixture of high density polyethylene, titanium dioxide, calcium carbonate, polystyrene and a resonate voiding agent, as well as an antioxidant and an antistatic agent. The material used for the optional outer layer or layers typically includes mixtures of various polyolefins (such as low density polyethylene or polypropylene) with high density polyethylene plus optional fillers and additives, for example $TiO_2$ and $CaCO_3$.

A typical formulation for the label material is set out in Example 1 below:

EXAMPLE 1

For the voided core layer:

| Type: | Grade | Description | Wt % |
|---|---|---|---|
| Polymer: | Marlex 5502BN | HDPE | 40 |
| Polymer: | Repsol 5502E | HDPE | 15.45 |
| Polymer: | Inneos 6070E | HDPE | 6.3 |
| Pigment: | Schulman 8176 White | 75% $TiO_2$ in HDPE | 6.3 |
| Filler: | Omyalene G200 | 86% $CaCO_3$ in 14% wax | 19.2 |
| Polymer: | Empera 124N | Crystal polystyrene | 3.9 |
| Voiding agent: | Dertoline MP 170 | Pentaerythritol ester maleic rosin | 7.9 |
| Filler: | Cabot Plasadd 8999 | 50% calcium oxide, 50% LDPE | 0.6 |
| Anti-oxidant: | Ciba Geigy B215FF | Phenolic anti-oxidant | 0.2 |
| Antistatic: | AkzoNobel NourymixAE375 | Quaternary amine | 0.15 |
| Total: | | | 100 |

For the outer skin layers:

| Type: | Grade | Description | Wt % |
|---|---|---|---|
| Polymer: | Marlex 5502BN | HDPE | 80 |
| Polymer: | Inneos 100-GA03 | Polypropylene | 8 |
| Filler: | Cabot PE-7000 | 50% $TiO_2$ 25% $CaCO_3$ 25% LDPE | 12 |
| Total: | | | 100 |

Alternatively, the synthetic paper may be based on other polymeric materials, for example polypropylene.

To manufacture the synthetic paper, the polymer materials are co-extruded through a die and then passed between cooled rollers to form a web. The web is delivered to a stretching machine, where it is stretched to form a stretched sheet. Generally, the dimensions of the sheet are increased in both the longitudinal and transverse directions by a ratio of between 1:2 and 1:10, a ratio of 1:4 being typical. This also reduces the overall thickness of the sheet, typically to approximately 100-120 µm. The stretching operation produces biaxial orientation of the polymer molecules and causes microscopic voids to form in the core layer of the sheet. This reduces the density of the sheet and increases its rigidity, making it suitable for use as a synthetic paper.

The stretched polymeric sheet typically has an overall thickness of about 100-120 µm. Typically, the voided core layer has a thickness of 100 µm, the upper skin layer, if present, has a thickness of 5-15 µm and the lower skin layer, if present, has a thickness of about 1-2 µm. The overall density of the stretched polymeric sheet, prior to coating, is typically about 0.5 g·cm$^{-3}$ and it has a weight or grammage of about 50 g·m$^{-2}$.

The density of the voided core layer is difficult to measure directly as it cannot be easily separated from the skin layers. However, its density can be calculated using the equation:

$$\rho_f \cdot t_f = \rho_c \cdot t_c + \rho_{s1} \cdot t_{s1} + \rho_{s2} \cdot t_{s2}$$

where $\rho_f$, $\rho_c$, $\rho_{s1}$, $\rho_{s2}$ are the densities and $t_f$, $t_c$, $t_{s1}$, $t_{s2}$ are the thicknesses of, respectively, the film (the entire polymeric sheet), the voided core layer, the upper skin layer and the lower skin layer. In a typical example, $\rho_f=0.5$ g·cm$^{-3}$, $\rho_c=0.445$ g·cm$^{-3}$, $\rho_{s1}=1.0$ g·cm$^{-3}$ and $\rho_{s2}=1.0$ g·cm$^{-3}$, when $t_f=111$ µm, $t_c=100$ µm, $t_{s1}=10$ µm and $t_{s2}=1$ µm.

A coating may be applied to both surfaces of the sheet using an air-knife coater, and then dried. After coating on both sides, the finished synthetic paper typically has a weight or grammage of about 70 g·m$^{-2}$. A typical formulation of the coating is as follows:

| | Parts by weight | Dry coat % |
|---|---|---|
| Water | 100 | N/A |
| Acrylate dispersant | 5 | 2.9 |
| Ground calcium carbonate | 11 | 6.3 |
| Precipitated aluminium silicate | 22 | 12.6 |
| Precipitated aluminium hydroxide | 67 | 38.5 |
| Anionic wetting agent | 2 | 1.2 |
| Acrylonitrile acrylate styrene and styrene/n-butanol copolymers | 63 | 36.2 |
| Ammonium zirconium carbonate | 4 | 2.3 |

Typical properties of the coated sheet are as follows:

| Property | Method | Units | Value |
|---|---|---|---|
| Weight (grammage) | ISO 536 | g·m$^{-2}$ | 70 |
| Thickness | DIN 53370 | µm | 117 |
| Whiteness | ISO 2470 | % | 90 |
| Opacity | DIN 53146 | % | 93 |
| Tensile strength MD/TD | ISO 527-3 | N·mm$^{-2}$ | 26/26 |
| Elongation at break MD/TD | ISO 527-3 | % | 80/65 |
| Tear strength MD/TD | ASTM D1004-66 | N·mm$^{-1}$ | 36/45 |

In the above table, MD refers to machine direction and TD refers to transverse direction.

Figure 3:
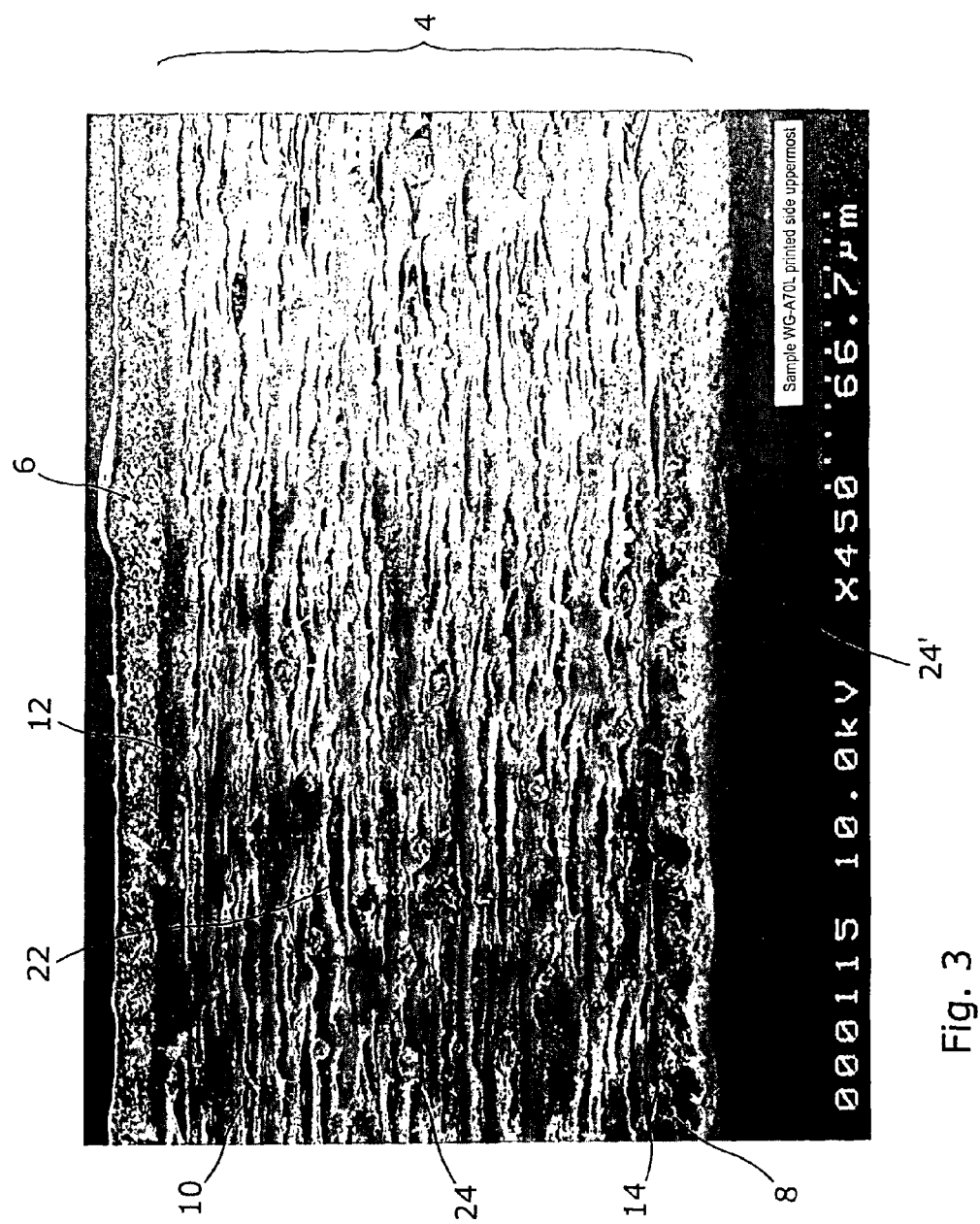
FIG. 3 is an electron micrograph showing in cross-section a polymeric label material.

FIG. 3 is an electron micrograph showing a cross-section through a sample piece of label material according to an embodiment of the invention. The label material includes a polymeric film 4 comprising a core layer 10, an upper skin 12 and a lower skin 14. The lower skin layer is extremely thin and is barely visible in the image. The upper skin layer 12 is much thicker and can be seen clearly as a substantially continuous band extending across the top of the sample. Within the core layer 10 numerous voids 22 can be seen. These voids 22 are roughly lenticular in shape and lie approximately in the plane of the sheet of label material. Granules of filler material 24 & 24' for example of calcium carbonate, can be seen in some of the voids 22. Some of these granules such as 24' appear to extend through the lower skin 14.

The film 4 is coated on its upper surface with a top coating layer 6 that includes organic binders and inorganic fillers and is designed to be receptive to printing inks. The film 4 is also coated on its lower surface with a bottom coating layer 8 of similar materials, which is designed to be receptive to water-based adhesives.

As described below, labels of this label material have been tested with water-based adhesives and found to have very rapid drying times, producing a strong bond between the label and the bottle or container to which it is applied within a few minutes. This is exceptionally rapid for labels made of a plastics material and is comparable to the drying times of traditional paper labels.

While not wishing to be bound by theory, it is believed that this very rapid drying feature results at least in part from the highly voided nature of the core layer and the reduced thickness or complete absence of a lower skin layer. The voided core has a high proportion of free space (typically 50% or more) and preferably an open cell structure, which allows it to absorb water rapidly from the adhesive. Once drawn into the core layer, the water can be absorbed by the filler materials, for example of calcium carbonate, and ultimately evaporates from the material. This very thin or complete absence of lower skin layer ensures that the water can flow into the core layer from the applied adhesive. It is believed that the granules of filler material perforate the lower skin layer (if present), giving it a porous structure and allowing the water to pass through.

The bottom coating material applied to the lower surface of the label material is also thought to aid rapid drying by increasing the wicking effect and encouraging water to move into the core layer. The bottom coating material is chosen to provide a high surface energy, so ensuring rapid wetting of the label material upon application of the water-based adhesive.

Labels made with a label material according to the invention have been tested for their suitability for use with water-based adhesives. This label material is referred to herein as Polyart WGA 70. For comparative purposes, an existing synthetic paper material intended for use as a wet glue label material and referred to as Polyart WL 109 was also tested.

The labels made of the label materials were applied on a Krones labelling line to both glass and PET (polyethylene terephthalate) bottles using Krones Colfix P9008 adhesive for PET bottles and Colfix S-4001 adhesive for glass bottles.

After application, the labels were tested to assess how quickly the adhesive dried and how well the labels adhered to the bottles. The degree of adhesion was tested using a delamination test, in which an attempt was made to peel the label from the bottle without causing it to delaminate (split apart). The time taken for the adhesive to reach a sufficient strength to prevent the label being removed whole (without delamination) was noted.

The Polyart WGA 70 material showed far superior drying characteristics compared to the Polyart WL 109 material when applied to bottles using the same machine settings and the same quantity of adhesive for both substrates. Label delamination was observed within 15 minutes of application. By contrast, the WL 109 material did not show any delamination 2 hours after application and only partial (edge) delamination after 5 hours due to incomplete drying of the adhesive. For both glass and PET bottles, it was found that rapid drying could be promoted by applying a minimum adhesive quantity.

A second test was carried out to compare the Polyart WGA 70 material with another readily available plastic label material, ExxonMobil Label-Lyte 95LP. This is a product that is sold and promoted as being well adapted for wet glue labelling.

Labels made of the Polyart WGA 70 label material were applied on a Krones labelling line to both glass and PET bottles again using Krones Colfix P9008 adhesive for PET bottles and Colfix S-4001 adhesive for glass bottles. In addition, labels of the ExxonMobil Label-Lyte 95LP material were applied to glass bottles. The Label-Lyte 95LP material was not tested on PET bottles due to limited material availability.

On glass bottles, the Polyart WGA 70 material showed far superior drying characteristics compared to the ExxonMobil Label-Lyte 95LP product. The results were in line with expectations as the good drying behaviour of the Polyart WGA 70 wet glue label product was identified during the previous labelling tests and laboratory studies.

Two versions of the printed WGA 70 grade were tested. These had two different varnishes as follows:

(i) Lubrizol—Algan C482N/1 "alkali resistant coating"

(ii) Actega—Terrawet G9/788-040

Labels made of these grades were affixed to glass beer bottles with Krones Colfix S4001 water-based adhesive. The applied labels showed acceptable drying characteristics. Label "floating" under thumb pressure was not much in evidence and drying of the edges to give a delamination bond was observed after several minutes. Very good drying was evident after 30 minutes with almost complete delamination. This drying performance was found to be far superior to the ExxonMobil Label-Lyte 95LP wet glue product.

By contrast, there was very little evidence of drying with the Label-Lyte 95LP wet glue product, even after several hours. Some very slight perimeter edge delamination was observed after several hours but most of the label was not stuck at all. The drying performance was thus considerably inferior to that of the Polyart WGA 70 material.

Label feeding of Polyart WGA 70 material was very impressive, running in short bursts of 50 bottles at 20,000 bottles per hour.

It was a similar story for PET bottles labelled with Polyart WGA 70 material using Krones Colfix P9008 adhesive. This is a higher tack adhesive used for plastic bottles and gave very good bond strength. Label delamination upon peeling was observed after as little as 5 minutes drying with the Polyart WGA 70 grade.

For both glass and PET bottles, the impressive dry time was improved further by reducing the adhesive quantities applied to the labels.

An alternative formulation for the label material is set out in Example 2 below:

EXAMPLE 2

| Grade | Type | % |
|---|---|---|
| Core | | |
| ExxonMobil Paxon AL55-003 | HDPE | 52.48 |
| Ampacet 101870 CaCO₃ PE MB | 75% Calcium Carbonate in 25% LLDPE | 9.73 |
| Ampacet 101870 White Chalk PE MB | 40% Calcium Carbonate and 20% Titanium Dioxide in 40% HDPE | 25.00 |
| Nova Chem Crystal PS 1300 | Crystal polystyrene | 4.17 |
| DRT Dertolene DP 0001 | Pentaerythritol ester of maleic rosin | 8.33 |
| Akzo Nobel Nourymix AE 350 | Tallow bis(2-hydroxyethyl)amine in 50% LDPE (anti-static agent) | 0.17 |
| Ciba Irganox B 215 | Thermal stability, processing aid and antioxidant | 0.10 |
| Ciba Irganox HP 136 | Thermal stability, processing aid and antioxidant | 0.02 |
| Total | | 100.00 |
| Skin | | |
| ExxonMobil Paxon AL55-003 | HDPE | 74 |
| ChevronPhillips Marflex 7120X | LLDPE | 25 |
| Ampacet 100401 Antioxidant PE MB | 5% Irganox in 95% LDPE | 1 |
| Total | | 100 |

The product was subsequently coated on both sides with the same coating formulation given in the previous example.

The label materials described above (Examples 1 & 2) and a prior art labelling material sold as Mobil Label-Lyte 95LP were tested for water absorption properties. The testing process is described below.

1) Introduction

The testers were supplied with samples of the materials for the measurement of Cobb water absorption.

2) Evaluation Procedure

Three samples were received for analysis:
a) Example 1: WGA 70 1933/12/9277A
b) Example 2: WGA70 2561 V 406
c) Prior art: Exxon Mobil Label-Lyte 95LP The water absorption properties of these materials were determined by the Cobb method (ISO 535) over time periods of 1 minute, 10 minutes and 30 minutes.

3) Evaluation Results

| | Cobb Water Absorption (g · m⁻²) | | |
|---|---|---|---|
| Sample | 1 minute | 10 mins | 30 mins |
| Example 1: WGA 70 1933/12/9277A | 1.8 | 2.2 | 2.0 |
| Example 2: WGA 70 2561 V 406 | 2 | 1.9 | 2.3 |
| Prior art: Exxon Mobil Label-Lyte 95LP | 0.03 | 0.2 | 0.2 |

4) Conclusions

Examples 1 and 2 showed substantial water absorption capabilities. Within the limits of the accuracy of the test, there was little change in water absorption over time with either of those samples, demonstrating that the water was absorbed rapidly into the material (in a period of less than one minute). Those materials are therefore highly suitable for use as a label material for labelling non-absorbent products, for example glass or plastic containers, using water-based adhesives.

By contrast, the Exxon Mobil Label-Lyte 95LP prior art material gave very little water absorption, even after a period of 30 minutes. The prior art material is therefore inferior to the materials of Examples 1 and 2 and is less suitable for use as a label material with water-based adhesives.

The invention claimed is:

1. A label material for use with water-based adhesives, said label material comprising a synthetic paper having an upper surface and a lower surface, the synthetic paper including a biaxially-oriented polymeric sheet having a voided layer, and a lower skin layer that is porous, does not include a voiding agent and has a thickness of about 1 pm, and an adhesive-receiving coating on a lower surface of the polymeric sheet, wherein the polymeric sheet has a density of less than 0.55 g·cm⁻³, the voided layer has a density of not more than 0.50 g·cm⁻³ and a void volume of at least 50%, wherein the voided layer includes a granular filler material and wherein the lower skin layer is perforated by granules of the filler material to provide a porous structure, and the adhesive-receiving coating includes a polymeric binder and an absorbent pigment, and has a surface energy of at least 40 dyne·cm⁻¹.

2. The label material of claim 1, wherein the synthetic paper has a grammage of not more than 80 g·m⁻².

3. The label material of claim 2, wherein the synthetic paper has a grammage of not more than 70 g·m⁻².

4. The label material of claim 1, wherein the synthetic paper has a thickness of at least 100 μm.

5. The label material of claim 1, wherein the voided layer has a thickness of at least 90 μm.

6. The label material of claim 1, wherein the biaxially-oriented polymeric sheet includes a substantially unvoided upper skin layer.

7. The label material of claim 6, wherein the upper skin layer has a thickness in the range 5-15 μm.

8. The label material of claim 1, wherein the voided layer has an open cell structure.

9. The label material of claim 1, wherein the voided layer and the skin layer or layers are co-extruded.

10. The label material of claim 1, wherein the polymeric sheet is made of a polymeric material based on polyethylene.

11. The label material of claim 10, wherein the polymeric material of the core layer includes a voiding agent.

12. The label material of claim 1, further comprising a printable coating on an upper surface of the polymeric sheet.

13. The label material of claim 12, wherein the printable coating further comprises a polymeric binder and an absorbent pigment.

14. The label material of 1, wherein the voided layer has a density of not more than 0.45 g·cm⁻³.

15. A labelled product including a product body and a label attached to the product body with a water-based adhesive, wherein the label is made of the label material of claim 1.

16. A method of labelling a product comprising attaching a label to a product body with a water-based adhesive, wherein the label is made of the label material of claim 1.

17. A label material for use with water-based adhesives, said label material comprising a synthetic paper having an upper surface and a lower surface, the synthetic paper including a biaxially-oriented polymeric sheet having a voided layer, and a lower skin layer that is porous, does not include a voiding agent and has a thickness of about 1 μm, and an adhesive-receiving coating on a lower surface of the polymeric sheet, wherein the polymeric sheet has a density of less than 0.50 g·cm⁻³, the voided layer has a density of not more than $0.50 \text{ g·cm}^{-3}$ and a void volume of at least 50%, wherein the voided layer includes a granular filler material and wherein the lower skin layer is perforated by granules of the filler material to provide a porous structure, and the adhesive-receiving coating includes a polymeric binder and an absorbent pigment, and has a surface energy of at least $40 \text{ dyne·cm}^{-1}$.

* * * * *